United States Patent
Tachibana et al.

(10) Patent No.: US 6,731,357 B1
(45) Date of Patent: May 4, 2004

(54) CELLULOSE ESTER FILM, PRODUCTION METHOD OF THE SAME, FILM EMPLOYED IN LIQUID CRYSTAL DISPLAY MEMBER, AND POLARIZING PLATE

(75) Inventors: Noriki Tachibana, Hino (JP); Kunio Shimizu, Hino (JP); Masahito Takada, Hino (JP); Isamu Michihata, Hino (JP); Koichi Nagayasu, Hino (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/492,404

(22) Filed: Jan. 27, 2000

(30) Foreign Application Priority Data

Jan. 27, 1999 (JP) .......................... 11/017976
Jul. 5, 1999 (JP) .......................... 11/190295

(51) Int. Cl.$^7$ .......................... G02F 1/1335; G02B 5/30
(52) U.S. Cl. .......................... 349/96; 428/1.31; 428/1.33
(58) Field of Search .................. 349/96, 122; 359/490, 359/491, 492, 494, 500; 428/1.3, 1.31, 1.5, 1.54

(56) References Cited

U.S. PATENT DOCUMENTS

| | | | | |
|---|---|---|---|---|
| 4,427,741 A | * | 1/1984 | Aizawa et al. | 428/332 |
| 4,726,659 A | * | 2/1988 | Conrad et al. | 349/128 |
| 4,820,813 A | * | 4/1989 | Schulz | 536/84 |
| 6,139,785 A | * | 10/2000 | Shuto et al. | 264/207 |
| 6,183,829 B1 | * | 2/2001 | Daecher et al. | 428/64.1 |
| 6,211,358 B1 | * | 4/2001 | Honda et al. | 536/64 |

\* cited by examiner

Primary Examiner—Toan Ton
Assistant Examiner—Tai Duong
(74) Attorney, Agent, or Firm—Finnegan, Henderson, Farabow, Garrett & Dunner, L.L.P.

(57) ABSTRACT

A film employed in a liquid crystal display member is disclosed. The film has film thickness of 20 to 60 $\mu$m and variation in the film thickness within ±3.0 percent of the standard film thickness.

14 Claims, 2 Drawing Sheets

CELLULOSE ESTER FILM, PRODUCTION METHOD OF THE SAME, FILM EMPLOYED IN LIQUID CRYSTAL DISPLAY MEMBER, AND POLARIZING PLATE

FIELD OF THE INVENTION

The present invention relates particularly to a suitable film as the polarizing plate protective film of a liquid crystal display unit.

A liquid crystal display unit (LCD) can be operated at low voltage as well as low electric power consumption, can be directly connected to an IC circuit, and can be specifically produced in a shape having less thickness. Accordingly, the liquid crystal display unit has been widely employed as a display unit for word processors, personal computers, and the like.

Such an LCD is basically constructed in such a manner that, for example, both sides of a liquid crystal cell are provided with polarizing plates.

The polarizing plate transmits light having a polarization plain in the definite direction. Accordingly, the LCD plays an important role to visualize the variation of orientation of liquid crystal due to an electric field. Namely, the performance of the LCD largely depends on that of the polarizing plate.

Figure 1:
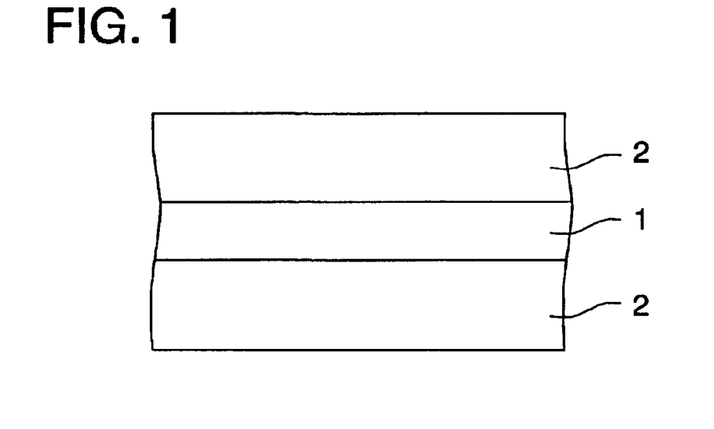
FIG. 1 is a schematic view of a polarizing plate.

FIG. 1 shows a common structure of the polarizing plate. In FIG. 1, reference numeral 1 is a polarizer, and both sides of said polarizer 1 are laminated with polarizing plate protective films 2. The LCD is constructed by laminating a liquid crystal cell with the polarizing plate having such a structure.

Polarizer 1 is prepared in such a manner that iodine and the like are adsorbed onto a polymeric film and the resulting film is stretched. Specifically, after a solution called H ink containing a dichroic substance (iodine) is wet-adsorbed onto a polyvinyl alcohol film, the dichroic substance is allowed to orient in one direction by uniaxially stretching the resulting film.

Employed as the polarizing plate protective film 2 are cellulose resins, especially cellulose triacetate.

Figure 2:
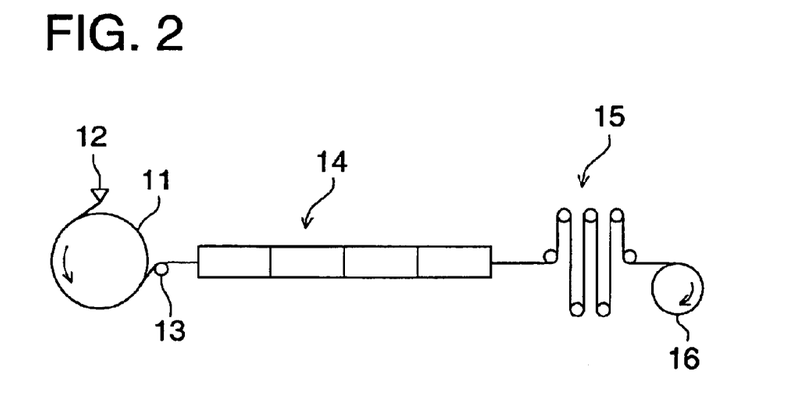
FIG. 2 is a schematic view of the casting apparatus of a polarizing plate protective film.
Figure 3:
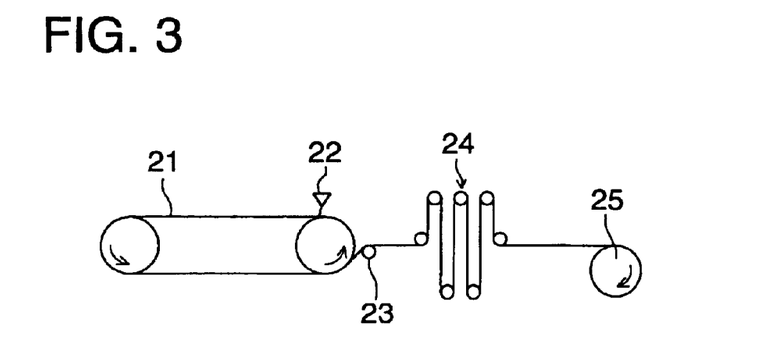
FIG. 3 is a schematic view of the casting apparatus of a polarizing plate protective film.

Said polarizing plate protective film 2 is produced employing apparatuses of a drum casting system shown in FIG. 2 and a belt casting system shown in FIG. 3.

In the drum casting apparatus, casting die 12 is provided adjacent to casting drum 11 and tenter drying section 14 via peeling roll 13, roll drying section 15 and winding roll 16 are provided. After a dope from the casting die is cast onto the casting drum, the resulting film is peeled from the casting drum 11, employing the peeling roll 13, is dried in a first, second, third, and fourth drying zones of the tenter drying section 14, completely dried in the roll drying section 15, and wound onto the winding roll 16.

In the belt casting apparatus shown in FIG. 3, casting die 22 is provided adjacent to casting belt 21, and roll drying section 24 via peeling roll 23 and winding roll 25 are provided. After a dope from the casting die 22 is cast onto the casting belt 21, the resulting film is peeled employing the peeling roll 23, completely dried in the roll drying section 24, and then wound by the winding roll 25. In this casting belt, the cast dope is dried at a high rate. As a result, the tenter drying section employed in the drum casting system is not required.

At present, the thickness of the polarizing plate protective film 2 is at least 80 μm, which is relatively thick.

Recently, from the viewpoint of optical properties such as transmittance and the like, a decrease in the thickness of the polarizing plate protective film has been demanded.

However, when the polarizing plate protective film having a thickness of below 80 μm is produced, it has been found that a number of wrinkles are formed in a film which is wound by the winding rolls 16 and 25 to markedly decrease the production yield.

SUMMARY OF THE INVENTION

An object of the present invention is to provide a suitable film employed for a liquid crystal display member, which results in minimal wrinkles which are likely to be formed when said film has a thickness of below 80 μm, increases the production yield, enhances transparency as well as retardation due to a decrease in the thickness.

Furthermore, a decrease in the thickness of a visibility angle enlarging film provided in the entire surface of a liquid crystal display apparatus and the like has been demanded, and said film has had the same problems as those of the polarizing plate protective film.

As the results of investigation performed by the present inventors, it has been discovered that as variation in film thickness increases, more wrinkles are formed, while as variation of the same decreases, less wrinkles are formed.

Further, as the results of detailed investigation on the ratio of wrinkle formation as well as variation in film thickness, it has been discovered that at the film thickness of no more than 60 μm, when variation in film thickness is within ±3.0 percent of the standard thickness (average film thickness) of said film, is preferably ±2.9 percent, and is more preferably ±2.8 percent, wrinkles, which are not permitted as the polarizing plate protective film, are not formed.

Further, it has been discovered that when a film having a thickness of no more than 60 μm is comprised of a cellulose ester film, frequency of wrinkle formation largely depends on the degree of average substitution. The average degree of substitution as described herein is defined based on the average number of hydroxyl groups among three of them in a unit composing cellulose, substituted with other substituents.

As the results of detailed investigation on the frequency of wrinkle formation as well as the average degree of substitution (the average number in entire cellulose of hydroxyl groups of three of them in a unit of $C_6H_{10}O_5$ composing said cellulose substituted with other substituents), it has been discovered that at the film thickness of no more than 60 μm, if the average degree of substitution is preferably between 2.88 and 3.00, is more preferably between 2.90 and 3.00, and is most preferably between 2.91 and 3.00, wrinkles which are not permitted in the polarizing plate protective film, markedly decrease.

The present invention has been achieved based on the aforementioned discoveries, and the aforementioned problems are solved employing a film for a liquid crystal display unit, which has a film thickness of 20 to 60 μm and a variation in film thickness within ±3.0 percent of the standard film thickness. The variation in film thickness is preferably within ±2.9 percent of the standard film thickness, and is more preferably within ±2.8 percent.

When the variation in film thickness is controlled within ±3.0 percent of the standard film thickness, in the case of a thin film in the range of 20 to 60 μm, especially in the range of 25 to 55 μm, and further in the range of 30 to 55 μm, wrinkles are not substantially formed. Namely, wrinkles, which are not permitted in the film for a liquid crystal display unit, especially a polarizing plate protective film, are not substantially formed. For example, when a 5000 m long film is wound, wrinkles, which are not permitted in the polarizing plate protective film, are not formed. As a result, the production yield increases.

Further, when the film for a liquid crystal display unit is comprised of cellulose ester film, adjusting the average degree of substitution to the range of 2.88 to 3.00 effectively minimizes wrinkles.

Namely, when a film comprised of cellulose ester having an average degree of substitution of 2.88 to 3.00 is wound in a roll, the formation of wrinkles is markedly minimized as the film thickness decreases from the range of 20 to 60 $\mu$m via the range of 25 to 55 $\mu$m, to the range of 30 to 55 $\mu$m. Namely, when the average degree of substitution of cellulose ester is at least 2.88, is preferably at least 2.90, and is more preferably at least 2.91, the film comprised of said cellulose ester is not subjected to wrinkling even using the thin film having a thickness of no more than 60 $\mu$m., that is, wrinkles which are not permitted in the polarizing plate protective film are not substantially formed. For example, when a 5000 m long film was wound, wrinkles, which were not permitted in the polarizing plate protective film, were not found. As a result, the high production yield was obtained.

The cellulose ester employed in the present invention preferably has a composition ratio of wood pulp cellulose/cotton linter cellulose=60/40 to 0/100 (in terms of weight ratio). When the polarizing plate protective film is comprised of the cellulose ester having such a ratio, a high quality polarizing plate protective film, having minimal wrinkles, is obtained.

The polarizing plate film having a thickness of no more than 60 $\mu$m is preferred because higher transparency as well as less phase difference is obtained.

Further, the polarizing plate protective film having a thickness of no more than 55 $\mu$m is more preferred. With the lower limit of the thickness, the thinner the film, the more it is preferred, if the resulting film exhibits sufficient mechanical strength. However, at present, from the viewpoint of the mechanical strength, the lower limit of the thickness is 20 $\mu$m, is preferably at least 25 $\mu$m, and is more preferably at least 30 $\mu$m.

Namely, when conditions to achieve the thickness of 20 to 60 $\mu$m as well as the variation in the film thickness within ±3.0 percent of the standard film thickness are satisfied, and further, the condition to achieve the average degree of substitution of 2.00 to 3.00 are simultaneously satisfied, first, problems with optical properties (transparency and phase difference properties) as well as wrinkle were simultaneously overcome and a high quality polarizing plate protective film was obtained.

The aforementioned film preferably has a tear strength of at least 7 g. The tear strength of at least 7 g is preferred, considering the mechanical strength as the polarizing plate protective film, as well as the winding operation during its production, which is carried at a high speed while applying tension as high as possible to the film so that wrinkles are not formed. The upper limit is not definite. However, when the element materials, which are now employed for the polarizing plate protective film, are taken into account, the specific tear strength is no more than 50 g.

A film is preferably comprised particularly of lower fatty acid esters of cellulose. Further, the film preferably comprises plasticizers in an amount of 1 to 30 percent by weight. Still further, the film preferably comprises an UV absorber in an amount of 0.01 to 5 percent by weight.

The film constructed, as described above, exhibits a haze of no more than 0.5 percent (preferably no more than 0.4 percent). Further, the film has a retardation value of no more than 10 nm (preferably no more than 8 nm, and more preferably no more than 4 nm). The film, having a haze of no more than 0.5 percent, preferably no more than 0.4 percent as well as a retardation value of no more than 10 nm, preferably no more than 8, exhibits sufficient performance as the polarizing plate protective film.

A film employed in a liquid crystal display member wherein film thickness is between 20 and 60 $\mu$m and variation in the film thickness is within ±3.0 percent of the standard film thickness.

A film employed in a liquid crystal display member wherein said film comprises cellulose ester having a ratio of wood pulp cellulose/cotton linter cellulose in the range of 40/60 to 0/100 (in weight ratio), and the thickness of said film is between 20 and 60 $\mu$m and the variation in the film thickness is within 3.0 percent of the standard film thickness.

A film employed in a liquid crystal display member wherein variation in the thickness of said film, which is wound over a length of 1500 m, is within ±3.0 percent of the standard film thickness.

A film employed in a liquid crystal display member wherein the thickness of said film is between 20 and 60 $\mu$m, and the variation in the thickness of said film, which is wound over a length of 1500 m, is within ±3.0 percent of the standard film thickness.

A cellulose ester film wherein a film thickness is 20 to 60 $\mu$m and an average degree of substitution is 2.00 to 3.00.

A cellulose ester film wherein a film thickness is 20 to 60 $\mu$m, and an average degree of substitution of the said film is 2.88 to 3.00, when said film having said thickness is wound in a roll over a length of at least 1000 m after saponification.

A production method of a cellulose ester film wherein a dope composition prepared by dissolving in a solvent composition materials for said film, which comprises cellulose ester having an average degree of substitution of 2.00 to 3.00, is cast into a film having a thickness of 20 to 60 $\mu$m employing a solution casting method.

A polarizing plate wherein said plate is provided with said cellulose ester film and a polarizer in which said cellulose ester film is overlay on said polarizer.

A polarizing plate wherein said plate is provided with said cellulose ester film and a polarizer in which said cellulose ester film is overlay on both surfaces of said polarizer.

DETAILED DESCRIPTION OF THE INVENTION

The thickness of the film for a liquid crystal display unit is preferably between 20 and 60 $\mu$m, and a variation in the film thickness is preferably within ±3.0 percent of the standard film thickness.

The film thickness is more preferably between 25 and 55 $\mu$m, and is most preferably between 30 and 55 $\mu$m. The variation in film thickness is more preferably within ±2.9 percent of the standard film thickness, and is most preferably within ±2.8 percent.

The variation in film thickness is measured as follows. When the variation in film thickness is measured during production or for a long film having a length of at least 1000 m or at least 1500 m, the film thickness is measured at every 50 mm in the width direction as well as in the casting direction, employing a β-ray film thickness meter. Standard film thickness is obtained by averaging all measurements. Further, variation in film thickness is obtained by expressing the maximum deviation from the standard film thickness in percentage. Furthermore, when the variation in film thickness in a film having an image size provided with a liquid crystal display unit, the film thickness is measured at every 50 mm in the long direction as well as in the short direction and the standard film thickness is obtained by averaging all measurements. Further, the variation in film thickness is obtained by expressing the maximum deviation from the standard film thickness in percentage.

Furthermore, the film for the liquid crystal display unit of the present invention may be comprised of a single layer or a multilayer. The film for the liquid crystal display unit include a polarizer protective film for protecting a polarizer, a visibility angle increasing film which is provided in front of the liquid crystal display unit and increases a visibility angle, a glare minimizing film, a non-reflective film, and the like. However, the present invention is not limited to these. Specifically, the film of the present invention is preferably employed as the polarizing plate protective film.

Employed as films for the liquid crystal display unit may be various types of transparent films. For example, are cited cellulose ester films, polycarbonate based films, polyacrylate based films, norbornane based resin films, syndiotactic polystyrene based films, polysulfone based films, polyester based resin and the like. Of these, the cellulose ester films are preferred. Furthermore, the transparent films as described herein preferably transmit at least 50 percent of visible light, more preferably transmits at least 70 percent, and most preferably transmit at least 80 percent.

The transparent support preferably has dimensional shrinkage ratio after stored for 3 hours at 80° C. of 0.05% or less, more preferably 0.03% or less.

The transparent support preferably has coefficient water absorption of 1.0 to 4.5%, more preferably 1.0 to 3.0%, particularly 1.0 to 2.5%.

A cellulose ester film, which is employed as the film for the liquid crystal display unit, preferably has an average degree of substitution of 2.88 to 3.00. The average degree of substitution is more preferably between 2.90 and 3.00, and is most preferably between 2.91 and 3.00.

Further, when after saponification, a film is wound in a roll over a length of at least 1000 m, the effects of the present invention are markedly exhibited. When the length of film is at least 1500 m, the effects of the present invention are more markedly exhibited, and when the length of film is at least 3000 m, the effects of the present invention are further more markedly exhibited. When the length of film is at least 4000 m, the effects of the present invention are still further more markedly exhibited.

Furthermore, a cellulose ester film, which is employed as the film for the liquid crystal display unit, is preferably comprised of the lower fatty acid ester of cellulose in which hydroxyl groups of said cellulose are substituted with lower fatty acids. Specifically, the average degree of substitution of three hydroxyl groups in cellulose, substituted with lower fatty acids, is preferably between 2.88 and 3.00.

Herein, the lower fatty acids in the lower fatty acid esters of cellulose mean fatty acids having no more than 6 carbon atoms, and include, for example, cellulose acetates such as cellulose diacetate, cellulose triacetate, and the like, and fatty acid ester mixtures such as cellulose propionate, cellulose butyrate, cellulose acetate propionate, cellulose acetate butyrate and the like. The most preferred lower fatty acid ester is cellulose triacetate. Particularly cellulose triacetate having an acetated degree of 54 to 62 percent (most preferably at least 59 percent) is preferred. Further, cellulose triacetate having a degree of polymerization of 250 to 400 is preferred.

Further, a film employing cellulose ester having a ratio of wood pulp cellulose/cotton linter cellulose in the range of 60/40 to 0/100 in terms of weight ratio is preferred.

Sum of content of mannose and xylose in the film is preferably 6 mol % or less, more preferably 4 mol % or less, in order to make easy separating the film in manufacturing process.

Further, the tear strength of the film for the liquid crystal display unit is preferably at least 7 g. The tear strength can be measured by a method shown in ISO 6383/2-1983. Still further, the haze of the same is preferably no more than 0.5 percent. Further, the retardation value of the same is preferably below 10 nm. The retardation value can be measured employing an automatic double refractometer. For instance, KOBRA 21DH (manufactured by KS Systems Co., Ltd.) and the like are cited.

If desired, in addition to the cellulose ester, the aforementioned film comprises matting agents such as fine silicon dioxide particles and the like.

Furthermore, said film preferably comprises one type or at least two types of UV absorbers. From the viewpoint of minimizing of the degradation of liquid crystal, UV absorbers are preferred, which exhibit efficient absorption for ultraviolet radiation having a wavelength of no longer than 370 nm and exhibit minimal absorption for visible light having a wavelength of no shorter than 400 nm. For instance, are listed oxybenzophenone based compounds, benzotriazole based compounds, salicylic acid ester based compounds, benzophenone based compounds, cyano acrylate based compounds, nickel complex based compounds, and the like. Particularly preferred UV absorbers are benzotriazole based compounds as well as benzophenone based compounds. Of these, benzotriazole compounds are preferred because they result in less coloration, which is not required for the cellulose ester. The added amount of UV absorbers is between 0.01 and 5 percent by weight (specifically between at least 0.5 and no more than 3 percent by weight).

Further, one type or at least two types of plasticizers are preferably incorporated. Preferably are incorporated, for example, phosphoric acid ester based plasticizers such as triphenyl phosphate, tricresyl phosphate, cresyldiphenyl phosphate, octyldiphenyl phosphate, diphenylbiphenyl phosphate, trioctyl phosphate, tributyl phosphate, and the like, and glycolic acid ester based plasticizers such as triacetin, tributyrin, butylphthalylbutyl glycolate, ethylphthalylethyl glycolate, methylphthalylethyl glycolate, butylphthalylbutyl glycolate, and the like. Of these, phthalic acid ester based and glycolic acid ester based plasticizers are preferred because these are not likely to result in hydrolysis of the cellulose ester. Furthermore, plasticizers having a solidifying point (an intrinsic solidifying point described in ENCYCLOPEDIA CHIMICA published by Kyoritsu Shuppan Co.) of no more than 20° C. are preferably incorporated.

Such plasticizers include, for example, tricresyl phosphate, cresylphenyl phosphate, tributylphosphate, diethyl phthalate, dimethyl phthalate, dioctyl phthalate, dibutyl phthalate, di-2-ethylhexyl phthalate, triacetin, ethylphthalylethyl glycolate, and the like. The content of plasticizers is between 1 and 30 percent by weight from the viewpoint of dimensional stability (specifically between at least 2 and no more than 20 percent by weight, and more specifically at least 10 and no more than 15 percent by weight). Further, the content of plasticizers having a solidifying point of no more than 20° C., especially no more than 14° C. is preferably increased because the flexibility of the cellulose ester film as well as machining properties of the film (such as slitting and stamping; when such machining is not well carried out, a cutting plane results in a saw-tooth shape and chips are generated, and when such chips are adhered onto the film, the performance of a liquid crystal display is deteriorated) is improved. Based on these, all plasticizers may have a solidifying point of no more than 20° C., especially no more than 14° C.

Solvents to compose a dope composition include, for example, alcohols (particularly, lower alcohols) such as methanol, ethanol, n-propyl alcohol, iso-propyl alcohol, n-butanol, and the like, and aliphatic hydrocarbons and chlorides thereof such as cyclohexane, dioxane, methylene chloride and the like. Regarding the content ratio of solvents, for example, the content ratio of methylene chloride is preferably between 70 and 95 percent by weight, and that of other solvents is preferably between about 5 and about 30 percent by weight.

Heating temperature after the addition of solvents is preferably between no less than the boiling point of employed solvents and no more than the boiling point of the resulting solution. For example, the temperature is set at no less than 60° C., particularly between 80 and 110° C. Pressure is applied so that the solution does not boil at the set temperature.

After dissolution, the resulting solution may be removed from the vessel during cooling, or may be removed from the vessel employing a pump or the like, cooled employing a heat exchanger, and employed after filtration.

A dope composition is prepared by dissolving the aforementioned film composing materials (such as cellulose ester, plasticizers, UV absorbers, and the like) in solvents, and the resulting dope is then cast employing a solution casting method. Thus the film of the present invention is obtained, which employs the lower fatty acid ester of cellulose as the raw material, and has a thickness of 20 to 60 $\mu$m (specifically, at least 25 $\mu$m, further, at least 30 $\mu$m, and no more than 55 $\mu$m), has a variation in the film thickness within ±3.0 percent (preferably within ±2.9 percent and more preferably within ±2.8 percent), and has an average degree of substitution of 2.88 to 3.00 (preferably at least 2.90 and more preferably at least 2.91). Specifically, the film according to the present invention is obtained which has a tear strength of at least 7 g, a haze of no more than 0.5 percent (particularly no more than 0.4 percent) and a retardation of no more than 10 nm (particularly no more than 8 nm).

In the case of the production of said film, techniques are utilized which are described in, for example, U.S. Pat. Nos. 2,492,978, 2,789,070, 2,739,069, 2,492,977, 2,336,310, 2,367,603, and 2,607,704; British Patent Nos. 64,071 and 735,892; and Japanese Patent Publication Nos. 45-9074, 49-4554, 49-5614, 60-27562, 61-39890, and 62-4208.

The film according to the present invention is obtained by regulating the amount of solvents, a gap between casting, dies, a casting speed, and a winding tension at the high residual volume of solvents as well as at the low residual volume of solvents. Specific values of theses vary depending on the dope composition and other conditions. Specifically, a variable for each of the aforementioned conditions is optionally set and at the time, said variable is regulated so that the variation in film thickness is in the range of the present invention.

Furthermore, the film of the present invention is more preferably produced employing a belt casting system apparatus as shown in FIG. 3, compared to a drum casting system apparatus as shown in FIG. 2.

The techniques described in the following references may be applied;

U.S. Pat. Nos. 2,492,978, 2,739,070, 2,739,069, 2,492,977, 2,336,310, 2,367,603 and 2,607,704, British Patent Nos. 64,071 and 735,892, JP-B Nos. 45-9074, 49-4554, 49-5614, 60-27562, 61-39890 and 62-4208.

The film satisfying the requirement of the present invention may be obtained by adjusting solvent content, gap of extrusion die, casting speed, and winding tensions at the time of high residual solvent content and at the time of low residual solvent content. The practical values vary depending upon dope composition or other condition, and therefore, parameters of the values which are provided adequately, should be adjusted so that the variation of film thickness satisfies the requirement of the present invention.

It is preferable to employ an apparatus casting on belt shown by FIG. 3 rather than an apparatus casting on drum shown by FIG. 2, when the film is prepared.

The liquid crystal display member of the present invention, for example, the polarizing plate is produced as follows.

For instance, the polarizing plate protective film, according to the present invention, for example, the alkali-treated cellulose ester film according to the present invention is adhered employing an aqueous solution of perfectly saponified polyvinyl alcohol on at least one side or preferably both sides of a polarizer prepared by adsorbing iodine and the like to a polymeric film followed by stretching. Instead of the alkali treatment, there may be employed methods described in Japanese Patent Publication Open to Public Inspection Nos. 6-94915 as well as 6-118232.

As described above, a polarizing plate comprised of polarizer 1 which is sandwiched with two sheets of polarizing plate protective film 2 is produced. Said polarizing plate comprises a polarizer as well as a protective film. The thickness of said protective film is between 20 and 60 $\mu$m, and the variation in the film thickness of said protective film is within ±3.0 percent of the standard film thickness. When said protective film is cellulose ester film, the average degree of substitution is preferably between 2.88 and 3.00.

Polarizer is preferably prepared with polyvinylalcohol or ethylene-vinylalcohol when the film of the invention is applied to the polarizing plate protect film. Polarizer prepared by blending ethylene-vinyl alcohol copolymer and polyvinyl alcohol is particularly preferable. In this case, content of ethylene-vinyl alcohol copolymer with reference to 100 parts of polyvinyl alcohol is preferably 0.1 to 1000 weight parts, more preferably 0.5 to 200 parts by weight and particularly preferably 1 to 100 parts by weight.

Ethylene content in ethylene-vinyl alcohol is preferably 1 to 25 mol %, more preferably 2 to 10 mol %, particularly preferably 5 to 10 mol %. Polymerization degree of the ethylene-vinyl copolymer is preferably 500 or more.

The blend of ethylene-vinyl alcohol copolymer and polyvinyl alcohol is preferably uniaxially stretched to prepare film.

Durability of the polarizing plate may be improved by employing the polarizer. The polarizer is subjected to immersing into solution of boric acid, which is crosslinking agent, for the purpose of improving durability of polarizing plate.

The liquid crystal display members as described in the present specification are members employed in a liquid crystal display unit, which include, for example, in addition to the aforementioned polarizing plate, a polarizing plate protective film, a phase difference plate, a reflective plate, a visibility angle increasing film, a glare minimizing film, a non-reflective film, an antistatic film, and the like.

Of these, the film of the present invention is suitable for the polarizing plate protective film.

Figure 4:
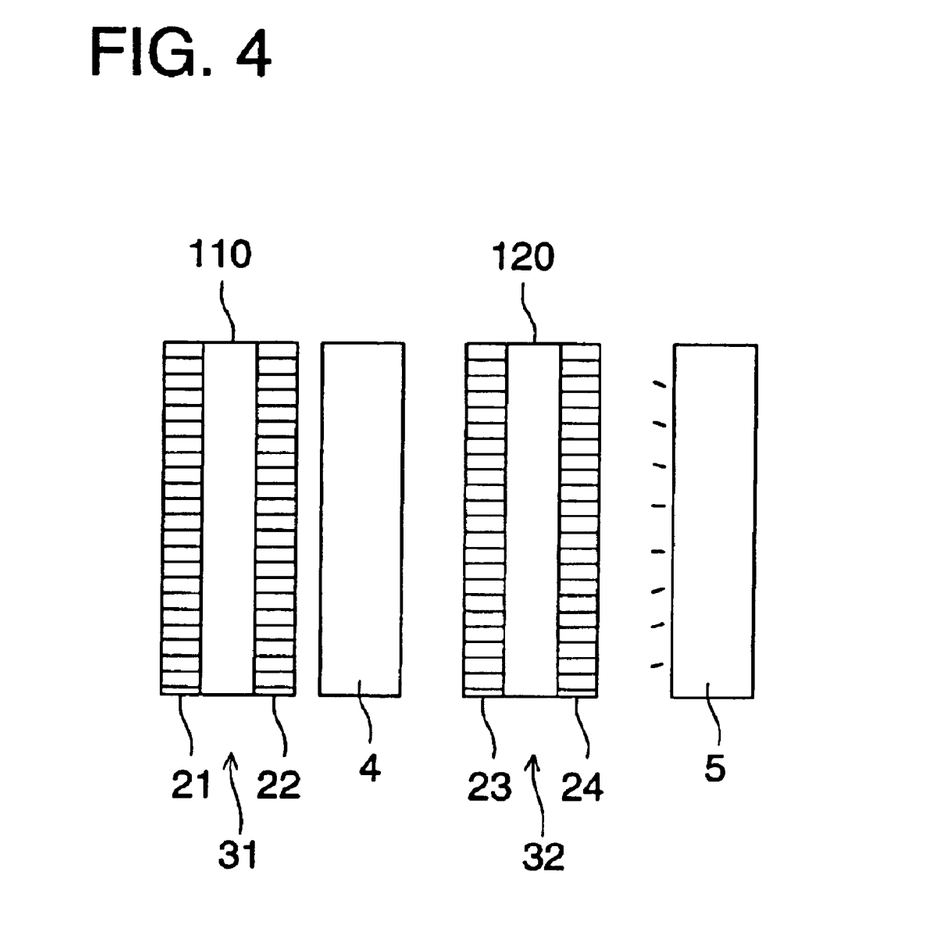
FIG. 4 is a schematic view of a liquid crystal display unit.

One example of the crystal display unit of the present invention will be briefly described with reference to a schematic view in FIG. 4. Said crystal display unit comprises first polarizing plate 31, liquid crystal cell 4, and second polarizing plate 32 provided in the interior of said first polarizing plate 31 as well as said liquid crystal cell 4. Furthermore, as a light source, back light 5 may be provided in the further interior of said second polarizing plate 32. Further, the first polarizing plate 31 is comprised of first polarizer 110, first protective film 21 provided on the surface of the first polarizer 110, which does not face the liquid crystal cell 4, and protective film 22 provided on the surface of the first polarizer 110, which faces the liquid crystal cell 4. Further, the second polarizing plate 32 is comprised of second polarizer 120, third protective film 23 provided on the surface of the second polarizer 120, which faces the liquid crystal cell 4, and fourth protective film 24 provided on the surface of the polarizer 32, which does not face the liquid crystal cell 4. Furthermore, at least one of the first protective film, the second protective film, the third protective film, and the fourth protective film has a film thickness of 20 to 60 μm as well as a variation in film thickness within ±3.0 percent. The particular preferable way is that each of the second protective film and the third protective film has a film thickness of 20 to 60 μm as well as a variation in film thickness within ±3.0 percent. In this instance, the first protective film and the fourth protective film may be made thicker. However, the protective film according to the present invention is preferably employed for the fourth protective film. Particular preferably the protective film according to the present invention is preferably employed for the first protective film.

Further, when the protective film, having a film thickness of 20 to 60 μm, is comprised of a cellulose ester film, the average degree of substitution of said cellulose ester film is preferably between 2.88 and 3.00. Of course, employed as these protective films may be the aforementioned film for the liquid crystal display unit.

EXAMPLE 1

Dope Composition

| | |
|---|---|
| Triacetyl cellulose having an acetated degree of 61.0 percent, employing the cellulose of wood pulp cellulose/cotton linter cellulose = 50/50 | 100 weight parts |

Plasticizer having the following formula

| | |
|---|---|
| Tinuvin 326 (UV absorber manufactured by Ciba Specialty Chemicals Co.) | 0.5 weight part |
| Tinuvin 328 (UV absorber manufactured by Ciba Specialty Chemicals Co.) | 0.5 weight part |
| Methylene chloride | 250 weight parts |
| Methanol | 250 weight parts |

The aforementioned composition was placed in a tight sealed vessel, heated while stirring at 70° C. under applied pressure, and perfectly dissolved. Thereafter, the resulting dope was filtrated.

The filtrated dope was then cast employing a solution casting method. Namely, a belt casting apparatus shown in FIG. 3 was employed, and said dope having a temperature of 33° C. was uniformly cast onto a stainless steel belt support. While regulating the temperature of the stainless steel belt support at 25° C., solvents were evaporated, and the resulting film was peeled from the stainless steel belt support. Thereafter, the film was conveyed employing many rolls in a drying zone and dried. The resulting cellulose triacetate film having a width of 1300 mm as well as a standard film thickness of 40 μm was wound under a winding tension of 10 kg/m over a length of 3000 m. Further, after peeling, a film portion having a residual solvent content of 25 percent by weight was conveyed under a winding tension of 14 kg/m (width), which was gradually reduced during drying, and was wound under a winding tension of 10 kg/m (width). Further, the residual solvent content was controlled so as to obtain 3 percent by weight.

Variation in film thickness of said cellulose triacetate film over a length of 3000 m was ±0.4 g (±1.0 percent).

Further, said cellulose triacetate film exhibited a haze of 0.3 percent, a retardation value (Re) of 2 nm, and a tear strength of 8 g.

An alkali treated film was obtained in such a manner the said cellulose triacetate was treated with a 2.5N aqueous sodium hydroxide solution at 40° C. for 60 seconds, washed for 3 minutes, and was subjected to formation of a saponified layer.

A polarizer was prepared by immersing a 120 μm thick polyvinyl alcohol film into 100 weight parts of an aqueous solution containing one weight part of iodine and 4 weight parts of boric acid and stretching four times the resulting film.

Further, a polarizing plate was prepared by adhering the aforementioned alkali-treated cellulose triacetate film onto both surfaces of the resulting polarizer, employing a 5% aqueous perfectly saponified polyvinyl alcohol solution as the adhesive.

EXAMPLE 2

A film was prepared by repeating the procedure of Example 1 with the exemption that in casting conditions of Example 1, the winding tension for the portion, having a residual solvent amount of 25 weight percent, was replaced with 18 kg/m (width), the winding tension, when the film is wound onto a winding core, was replaced with 9 kg/m (width), and the residual solvent amount, when wound onto the winding core, was replaced with 5 percent by weight.

The resulting cellulose triacetate film having a width of 1300 mm as well as a standard film thickness of 40 μm, which was wound under a winding tension of 10 kg/m over a length of 3000 m, hada variation in film thickness of ±0.7 μm (±1.0 percent), a haze of 0.3 percent, a retardation value (Re) of 2 nm, and a tear strength of 8 g.

EXAMPLE 3

A film was prepared by repeating the procedure of Example 1 with the exception that in casting conditions of Example 1, the winding tension for the portion, having a residual solvent amount of 25 weight percent, was replaced with 10 kg/m (width), and the residual solvent amount, when wound onto a winding core, was replaced with 5 percent by weight.

The resulting cellulose triacetate film having a width of 1300 mm as well as a standard film thickness of 40 μm, which was wound under a winding tension of 10 kg/m over a length of 3000 m, had a variation in film thickness of ±1.0 μm (±2.5 percent), a haze of 0.3 percent, a retardation value (Re) of 2 nm, and a tear strength of 8 g.

EXAMPLE 4

A film was prepared by repeating the procedure of Example 1 with the exception that in casting conditions of Example 1, the winding tension for the portion, having a residual solvent amount of 25 weight percent, was replaced with 25 kg/m (width), the winding tension, when the film is wound onto a winding core, was replaced with 12 kg/m (width), and the residual solvent amount, when the film was wound onto the winding core, was replaced with 5 percent by weight.

The resulting cellulose triacetate film having a width of 1300 mm as well as a standard film thickness of 40 μm, which was wound under a winding tension of 10 kg/m over a length of 3000 m, had a variation in film thickness of ±1.2 μm (±3.0 percent), a haze of 0.3 percent, a retardation value (Re) of 2 nm, and a tear strength of 8 g.

EXAMPLE 5

A film was prepared by repeating the procedure of Example 1 with the exception that a dope component, triacetyl cellulose (cellulose having a ratio of wood pulp cellulose/cotton liter cellulose=50/50, was employed, and the acetated degree was 61.0 percent), which was employed in Example 1, was replaced with triacetyl cellulose (cellulose having a ratio of wood pulp cellulose/cotton liter cellulose=70/30, was employed, and the acetated degree was 61.0 percent), and in the casting conditions, the winding tension for the portion, having a residual solvent amount of 25 weight percent, was replaced with 18 kg/m (width), the winding tension, when the film is wound onto a winding core, was replaced with 9 kg/m (width), and the residual solvent amount, when the film was wound onto the winding core, was replaced with 3 percent by weight.

The resulting cellulose triacetate film having a width of 1300 mm as well as a standard film thickness of 40 μm, which was wound under a winding tension of 10 kg/m over a length of 3000 m, had a variation in film thickness of ±1.0 μm (±2.5 percent), a haze of 0.3 percent, a retardation value (Re) of 2 nm, and a tear strength of 8 g.

EXAMPLE 6

A film was prepared by repeating the procedure of Example 1 with the exception that in casting conditions of Example 1, the winding tension for the portion, having a residual solvent amount of 25 weight percent, was replaced with 19 kg/m (width), the winding tension, when the film is wound onto a winding core, was replaced with 9 kg/m (width), and the residual solvent amount, when the film was wound onto the winding core, was replaced with 2 percent by weight.

The resulting cellulose triacetate film having a width of 1300 mm as well as a standard film thickness of 50 μm, which was wound under a winding tension of 10 kg/m nover a length of 3000 m, had a variation in film thickness of ±1.0 μm (±2.0 percent), a haze of 0.35 percent, a retardation value (Re) of 3 nm, and a tear strength of 10 g.

EXAMPLE 7

A film was prepared by repeating the procedure of Example 1 with the exception that in casting conditions of Example 1, the winding tension for the portion, having a residual solvent amount of 25 weight percent, was replaced with 15 kg/m (width), the winding tension, when the film is wound onto a winding core, was replaced with 9 kg/m (width), and the residual solvent amount, when wound onto the winding core, was replaced with 3 percent by weight.

The resulting cellulose triacetate film having a width of 1300 mm as well as a standard film thickness of 35 m, which was wound under a winding tension of 10 kg/m over a length of 3000 m, had a variation in film thickness of ±0.7 μm (±2.0 percent), a haze of 0.25 percent, a retardation value (Re) of 1 nm, and a tear strength of 7 g.

Comparative Example 1

A film was prepared by repeating the procedure of Example 1 with the exception that in casting conditions of Example 1, the winding tension for the portion, having a residual solvent amount of 25 weight percent, was replaced with 10 kg/m (width), the winding tension, when the film is wound onto a winding core, was replaced with 10 kg/m (width), and the residual solvent amount, when the film was wound onto the winding core, was replaced with 5 percent by weight.

The resulting cellulose triacetate film having a width of 1300 mm as well as a standard film thickness of 40 m, which was wound under a winding tension of 10 kg/m over a length of 3000 m, had a variation in film thickness of ±2.0 μm (±5.0 percent), a haze of 0.3 percent, a retardation value (Re) of 2 nm, and a tear strength of 8 g.

Comparative Example 2

A film was prepared by repeating the procedure of Example 1 with the exception that in casting conditions of Example 1, the winding tension for the portion, having a residual solvent amount of 40 weight percent, was replaced with 15 kg/m (width), the winding tension, when the film is wound onto a winding core, was replaced with 15 kg/m (width), and the residual solvent amount, when the film was wound onto the winding core, was replaced with 5 percent by weight.

The resulting cellulose triacetate film having a width of 1300 mm as well as a standard film thickness of 40 m, which was wound under a winding tension of 10 kg/m over a length of 3000 m, had a variation in film thickness of ±1.5 μm (±3.8 percent), a haze of 0.3 percent, a retardation value (Re) of 3 nm, and a tear strength of 8 g.

Comparative Example 3

A film was prepared by repeating the procedure of Example 1, except that a dope component, triacetyl cellulose (employing cellulose having a ratio of wood pulp cellulose/ cotton liter cellulose=50/50, with an acetated degree of 61.0 percent) which was employed in Example 1 was replaced with triacetyl cellulose (employing cellulose having a ratio of wood pulp cellulose/cotton liter cellulose=70/30, with an acetated degree of 61.0 percent), and in the casting conditions, the winding tension for the portion, having a residual solvent amount of 25 weight percent, was replaced with 10 kg/m (width), the winding tension, when the film was wound onto a winding core, was replaced with 10 kg/m (width), and the residual solvent amount when the film was wound onto the winding core, was replaced with 5 percent by weight.

The resulting cellulose triacetate film having a width of 1300 mm as well as a standard film thickness of 50 m, which was wound under a winding tension of 10 kg/m over a length of 3000 m, had a variation in film thickness of ±1.8 μm (±3.6 percent), a haze of 0.3 percent, a retardation value (Re) of 3 nm, and a tear strength of 10 g.

Properties

Degree of wrinkling was visually evaluated for each of wound films prepared in the aforementioned examples. Table 1 shows the results.

Thereafter, the filtrated dope was cast employing a solution casting method. Namely, a belt casting apparatus shown in FIG. 3 was employed, and said dope at 33° C. was uniformly cast onto a stainless steel belt support. While maintaining the temperature of the stainless steel belt support at 25° C., solvents were evaporated, and the resulting film was peeled from the stainless steel belt support. The film was then conveyed employing many rolls in a drying zone and dried. The resulting cellulose triacetate film having a width of 1300 mm as well as a standard film thickness of 30 μm was wound under a winding tension of 10 kg/m (width) over a length of 3000 m. Further, after peeling, the film portion, having a residual solvent content of 25 percent by weight, was conveyed under a winding tension of 15 kg/m (width), which was gradually reduced during drying, and was wound under a winding tension of 8 kg/m (width). Further, the residual solvent content was controlled so as to obtain 3 percent by weight.

Variation in film thickness of said cellulose triacetate film, having a standard film thickness (average film thickness) of 30 μm over a length of 3000 m, was ±0.6 μm 2.0 percent). The film thickness was a value obtained by employing an automatic film thickness on-line measuring apparatus manufactured by Yokokawa Denki Co.

TABLE 1

|  | Film Thickness | Variation in Film Thickness | Haze (%) | Re (nm) | Tear Strength | Degree of Wrinkling (1) | Degree of Wrinkling (2) | | |
| --- | --- | --- | --- | --- | --- | --- | --- | --- | --- |
| Example 1 | 40μ | ±1.0% | 0.3 | 2 | 8 g | A | A | A | A |
| Example 2 | 40 | ±1.8% | 0.3 | 2 | 8 g | A | A | A | A |
| Example 3 | 40 | ±2.5% | 0.3 | 2 | 8 g | A | A | A | A |
| Example 4 | 40 | ±3.0% | 0.3 | 3 | 8 g | A | A | A | A |
| Example 5 | 40 | ±2.5% | 0.3 | 2 | 8 g | A | B | A | B |
| Example 6 | 50 | ±2.0% | 0.35 | 3 | 10 g | A | A | A | A |
| Example 7 | 35 | ±2.0% | 0.25 | 1 | 7 g | A | A | A | A |
| Comparative Example 1 | 40 | ±5.0% | 0.3 | 2 | 8 g | B | C | C | C |
| Comparative Example 2 | 40 | ±3.8% | 0.3 | 3 | 8 g | B | B | C | C |
| Comparative Example 3 | 50 | ±3.6% | 0.3 | 3 | 10 g | B | B | C | C |

*Degree of Wrinkling (1) was obtained by inspecting wrinkles formed in the portion which was wound over a length of 1500 m, while Degree of Wrinkling (2) was obtained by inspecting wrinkles formed in the portion which was wound over a length of 3000 m. FIG. 30 indicates a winding speed of 30 m/minutes, while 50 indicates a winding speed of 50 m/minutes. "A" indicates that no wrinkles were observed; "B" indicates that the formation of minimal wrinkles was observed; and "C" indicates that the formation of wrinkles was definitely observed.

EXAMPLE 8

Dope Composition

| | |
| --- | --- |
| Triacetyl cellulose having an average degree of substitution of 2.95, employing cellulose of wood pulp cellulose/cotton linter cellulose = 26/75 | 100 weight parts |
| Triphenyl phosphate | 2 weight parts |
| Ethylphthalyl glycolate | 3 weight parts |
| Tinuvin 326 (UV absorber manufactured by Ciba Specialty Chemicals Co.) | 0.5 weight part |
| Tinuvin 328 (UV absorber manufactured by Ciba Specialty Chemicals Co.) | 0.5 weight part |
| Methylene chloride | 250 weight parts |
| Methanol | 250 weight parts |

The aforementioned composition was placed in a tight sealed vessel, heated while stirring at 70° C. under applied pressure, and perfectly dissolved. The resulting dope was then filtrated.

Further, said cellulose triacetate film had a haze of 0.35 percent, a retardation value (Re) of 3 nm, and a tear strength of 10 g.

An alkali treated film was obtained in such a manner the said cellulose triacetate specified as above was treated with a 2.5N aqueous sodium hydroxide solution for 60 seconds, washed for 3 minutes, and was subjected to formation of a saponified layer.

Furthermore, a polarizer was prepared by immersing a 120 μm thick polyvinyl alcohol film into 100 weight parts of an aqueous solution containing one weight part of iodine and 4 weight parts of boric acid, and stretching four times the resulting film.

Further, a polarizing plate was prepared by adhering the aforementioned alkali-treated cellulose triacetate film on both surfaces of the resulting polarizer, employing a 5% aqueous perfectly saponified polyvinyl alcohol solution as the adhesive.

EXAMPLE 9

A film was prepared by repeating the procedure of Example 8 with the exception that in casting conditions of Example 8, 15 kg (width) of the winding tension for the portion, having a residual solvent amount of 25 weight percent, was replaced with 14 kg/m (width), and 3 percent by weight of the residual solvent amount, when the film was wound onto the winding core, was replaced with 5 percent by weight.

The cellulose triacetate film having a width of 1300 mm as well as a standard film thickness of 30 $\mu$m, prepared as described above, had a variation in film thickness of ±0.7 $\mu$m (±2.3 percent), a haze of 0.25 percent, a retardation value (Re) of 1 nm, and a tear strength of 7 g.

EXAMPLE 10

A film was prepared by repeating the procedure of Example 9 with the exception that the triacetyl cellulose having an average degree of substitution of 2.95, which was employed in Example 9, was replaced with one prepared by saponifying said triacetyl cellulose (having an average degree of substitution of 2.95 which was not substantially varied due to the saponification).

The cellulose triacetate film having a width of 1300 mm as well as a standard film thickness of 30 $\mu$m, prepared as described above, had a variation in film thickness of ±0.7 $\mu$m (±2.3 percent), a haze of 0.24 percent, a retardation value (Re) of 1 nm, and a tear strength of 7 g.

EXAMPLE 11

A film was prepared by repeating the same procedure with the exception that triacetyl cellulose having an average degree of substitution of 2.95, employed in Example 8, was replaced with triacetate film having an average degree of 2.93, and in casting conditions of Example 1, 15 kg/m (width) of the winding tension for the portion, having a residual solvent amount of 25 weight percent, was replaced with 18 kg/m (width), 8 kg/m (width) of the winding tension, when the film is wound onto a winding core, was replaced with 10 kg/m (width), and further, 3 percent by weight of the residual solvent amount, when the film was wound onto the winding core, was replaced with 5 percent by weight.

The cellulose triacetate film having a width of 1300 mm as well as a standard film thickness of 40 $\mu$m, prepared as described above, had a variation in film thickness of ±1.2 $\mu$m (±3.0 percent), a haze of 0.30 percent, a retardation value (Re) of 3 nm, and a tear strength of 8 g.

EXAMPLE 12

A film was prepared by repeating the procedure of Example 11 with the exception that in casting conditions of Example 11, 18 kg/m of the winding tension for the portion, having a residual solvent amount of 25 weight percent, was replaced with 25 kg/m (width), and 10 kg/m (width) of the winding tension, when the film is wound onto a winding core, was replaced with 12 kg/m (width).

The cellulose triacetate film having a width of 1300 mm as well as a standard film thickness of 40 $\mu$m, prepared as described above, had a variation in film thickness of ±0.4 $\mu$m (±1.0 percent), a haze of 0.30 percent, a retardation value (Re) of 2 nm, and a tear strength of 8 g.

EXAMPLE 13

A film was prepared by repeating the procedure with the exception that triacetyl cellulose, having an average degree of substitution of 2.95, employed in Example 8, was replaced with triacetate film having an average degree of 2.90, and in casting conditions of Example 1, 15 kg/m (width) of the winding tension for the portion, having a residual solvent amount of 25 weight percent, was replaced with 20 kg/m (width), 8 kg/m (width) of the winding tension, when the film is wound onto a winding core, was replaced with 10 kg/m (width), and further, 3 percent by weight of the residual solvent amount, when the film was wound onto the winding core, was replaced with 5 percent by weight.

The cellulose triacetate film having a width of 1300 mm as well as a standard film thickness of 40 $\mu$m, prepared as described above, had a variation in film thickness of ±1.0 $\mu$m (±2.5 percent), a haze of 0.30 percent, a retardation value (Re) of 2 nm, and a tear strength of 8 g.

EXAMPLE 14

A film was prepared by repeating the procedure with the exception that in casting conditions of Example 13, 20 kg/m. (width) of the winding tension for the portion, having a residual solvent amount of 25 weight percent, was replaced with 18 kg/m (width), and 10 kg/m (width)of the winding tension, when the film is wound onto a winding core, was replaced with 8 kg/m (width).

The cellulose triacetate film having a width of 1300 mm as well as a standard film thickness of 40 $\mu$m, prepared as described above, had a variation in film thickness of ±0.7 $\mu$m (±1.75 percent), a haze of 0.30 percent, a retardation value (Re) of 2 nm, and a tear strength of 8 g.

(Properties)

Degree of wrinkling was visually evaluated for each of wound films prepared in the aforementioned Examples. Table 2 shows the results.

TABLE 2

| | Degree of Wrinkling during Winding 1500 m Winding Speed | | Degree of Wrinkling during Winding 3000 m Winding Speed | |
|---|---|---|---|---|
| | 30 m/min | 50 m/min | 30 m/min | 50 m/min |
| Example 8 | A | A | A | A |
| Example 9 | A | A | A | A |
| Example 10 | A | A | A | A |
| Example 11 | A | A | A | B |
| Example 12 | A | A | A | A |
| Example 13 | A | A | A | C |
| Example 14 | A | A | A | B |

A: no wrinkles were observed
AB: wrinkles were slightly observed
B: some wrinkles were observed
C: wrinkles were clearly observed Namely, wrinkles of the cellulose ester film according to the present invention, when wound in a roll shape, are minimized to increase the yield, and the decrease in film thickness enhances the transparency as well as the retardation. Accordingly it is found that said film is suitably employed as a liquid crystal display member.

Wrinkles are minimized which tend to occur, when the thickness of a film decreases, and the yield increases. The decrease in film thickness enhances the transparency as well as the retardation. As a result, a suitable film for a liquid crystal display member is obtained.

Accordingly, a polarizing plate may be obtained which exhibits high transparency, minimal degradation, and stabilized quality. Further, liquid crystal display units having excellent visibility may be consistently obtained.

Disclosed embodiment can be varied by a skilled person without departing from the spirit and scope of the invention.

What is claimed is:

1. A polarizing plate comprising a polarizer and a polarizing plate protective film wherein thickness of the polarizing plate protective film is 20 to 60 μm and variation in the film thickness of the polarizing plate protective film is within ±3.0 percent the standard film thickness.

2. The polarizing plate of claim 1 wherein the polarizing plate protective film is provided on each of both sides of the polarizer.

3. The polarizing plate of claim 1 wherein the polarizing plate protective film comprises a cellulose ester film.

4. The polarizing plate of claim 1 wherein average degree of substitution of the cellulose ester film is 2.88 to 3.00.

5. A polarizing plate protective film for a liquid crystal display member, the film comprising a cellulose ester film, wherein a) a length of the polarizing plate protective film is at least 1000 m, b) a thickness of the polarizing plate protective film is 20 to 60 μm, and c) variation in the thickness of the polarizing plate protective film is within ±3.0 percent to an average thickness of the polarizing plate protective film.

6. The polarizing plate protective film of claim 5 wherein average degree of substitution of the cellulose ester film is 2.88 to 3.00.

7. The polarizing plate protective film of claim 5 wherein cellulose ester film is a film employing a composition ratio of wood pulp cellulose/cotton linter cellulose=60/40 to 0/100 in terms of weight ratio.

8. The polarizing plate protective film of claim 5 wherein cellulose ester film is comprised of lower fatty acid esters of cellulose.

9. The polarizing plate protective film of claim 5 wherein a length of the film is at least 1500 m.

10. The polarizing plate protective film of claim 5 wherein tear strength of the film is at least 7 g.

11. The polarizing plate protective film of claim 5 wherein haze of the film is no more than 0.5 percent.

12. The polarizinq plate protective film of claim 5 wherein retardation value of the film is below 10 nm.

13. The polarizing plate protective film of claim 5 wherein the film comprises a plasticizer in an amount of 1 to 30 percent by weight.

14. The polarizing plate protective film of claim 5 wherein the film comprises an UV absorber in an amount of 0.01 to 5 percent by weight.

* * * * *